Patented May 16, 1939

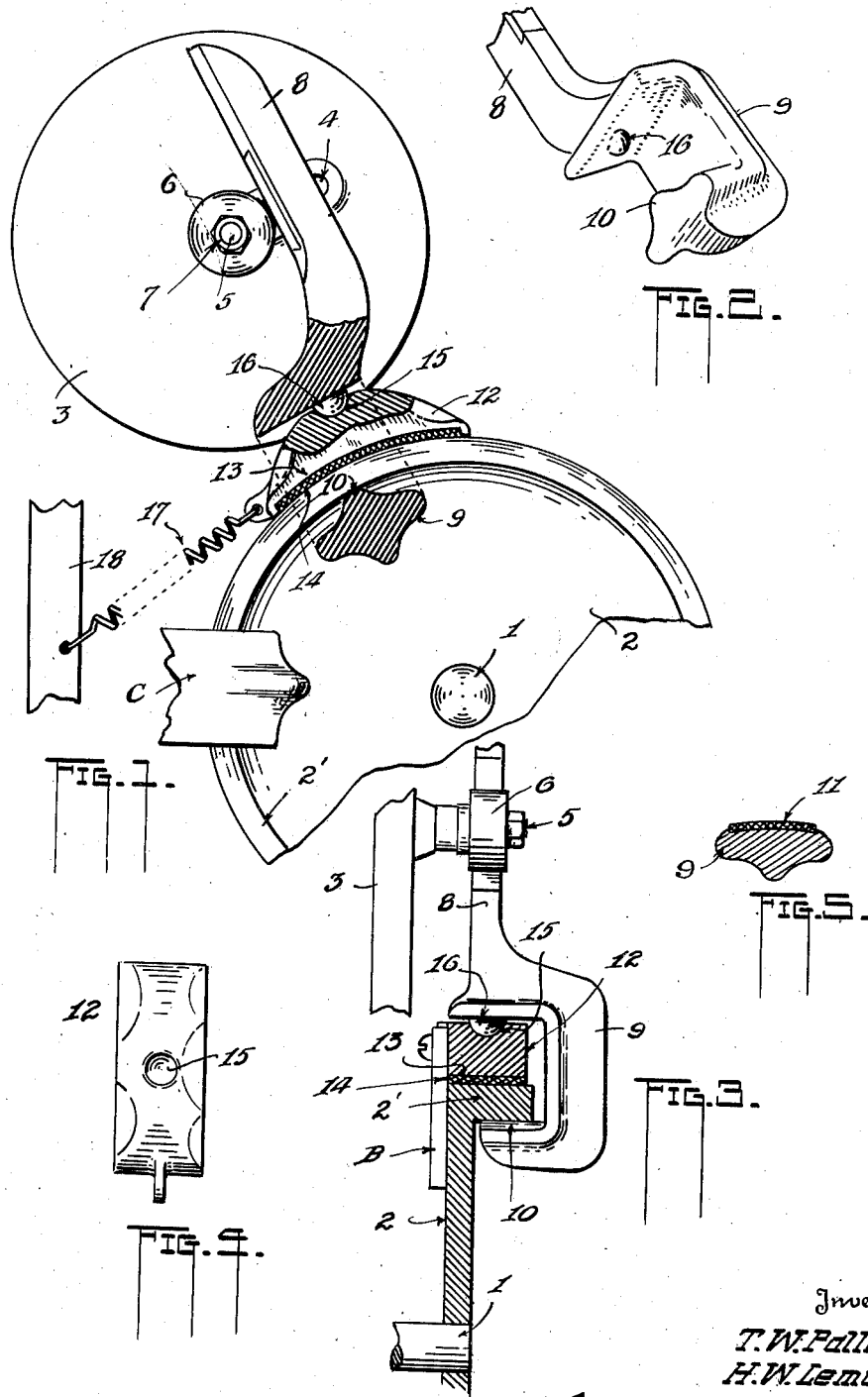

2,158,677

UNITED STATES PATENT OFFICE 2,158,677

CLUTCH

Thomas W. Pallister and Henry W. Leman, Peoria, Ill.; said Pallister assignor to Advance Appliance Co., Peoria, Ill., a corporation of Illinois Application March 9, 1938, Serial No. 194,820

4 Claims. (Cl. 74—162)

This invention relates to improvements in clutches. More particularly the invention is directed to a clutch for use with coal stokers for driving the feed mechanism employed for advancing the coal to the retort of such stoker, though, of course, the clutch is adapted for other uses as well.

The main object of the invention is to provide a clutch so appointed that it will be wholly positive in its grip upon and in its rotation of a member to be driven.

A further object is to so relate the gripping parts of a clutch to each other as to cause the instant driving engagement with a member to be driven to the end that there will be no lost motion especially as applied to a coal stoker.

Another object is to construct a clutch for driving a rotatable drum, for example, that includes a gripping shoe so associated with an operating arm or lever as to be free to tilt in all directions and thus accommodate itself to any and all conditions and inequalities of the parts with which it is used.

Still another object is to provide a ball and socket arrangement between an operating arm of a clutch and a gripping shoe thereof to provide a universal-joint action, and to so dispose said ball and socket in the constituted clutch that the pressure of the said shoe at the leading end of said shoe, or that advanced in the direction of driving action, will be first applied in a cam action to the member to be rotated.

A further object lies in constructing a clutch mechanism wherein its movement will be smooth and free, and in action entirely noiseless, as required especially in coal stokers for use in residences.

That the invention may be fully understood the appended drawing are provided forming part hereof, and wherein—

Figure 1 is a front elevation of the clutch of our invention and such parts as enter into the use of the same, certain portions being shown in section.

Figure 2 illustrates in perspective part of a clutch lever shown in Figure 1.

Figure 3 is a side elevation of parts shown in Figure 1, parts thereof appearing in transverse section.

Figure 4 is a plan of a clutch shoe shown in the earlier figures, and

Figure 5 is a transverse section of a part of a slightly modified form of lever shown in the other figures.

It is well known that a clutch for use in driving the conveyor-screws of coal stokers now in quite general use must operate positively, or with no slippage, in order that the stoker may best serve its purpose in the matter of economy in the use of fuel. Also that the clutch parts must act silently, since the least noise arising therefrom would at once be transmitted through the machine parts and air conduits to locations other than that in which the stoker may be installed.

While the provision of a clutch answering these requirements might seem to be an easy matter it has been found to be quite otherwise, and it has been found that having provided for the positive action as the first need, the second need is at once met due to the structure used, such structure or an equivalent thereof forming the subject of the invention and now to be described.

In the drawing, 1 denotes a shaft to carry or drive a screw-conveyor, of a new well known type of stoker, neither of the two latter being illustrated, said shaft having affixed thereto a drum 2 to be rotated. Spaced from the said shaft is a driving member, which, in this instance, takes the form of a plate 3, whose axis of rotation parallels that of said shaft, and is provided with a radial slot 4 adjustable within which is a stud 5 carrying a cam 6 which may be adjusted toward or away from the center of plate-rotation at 7, the parts thus far being those now long in use and therefore not new of themselves herein.

A lever arm is represented at 8 whose one end is adapted to receive the thrust of the cam 6 as that member moves in its orbit around the said center of rotation 7 of said plate 3. The opposite end of the lever terminates in a bifurcated end 9 adapted to engage over or lie astride the extended flange 2' of the said drum as in figure 3, the said bifurcated end 9 being offset from the opposite end as shown in Figure 1 by preference, a line drawn through the axes of the shaft 1 and plate 3 passing through said offset end about midway of its width.

The opposite extensions of the latter may substantially parallel each other, the face of the extension within the drum-flange 2' having a rounded nose 10 to have gripping engagement with the inner face of the flange, or as in Figure 5 at 9 the extension may have substantially the same curvature as said flange and carry a suitable fabric or other type of friction lining 11 as an alternate form.

The recess between the extensions of the end 9 of the lever is such as to receive the named drum-flange 2' together with a shoe 12 having an arcuate face 13 to conform substantially to the convex surface of the exterior of the drum-flange 2', there being preferably included therewith a nonmetallic liner and on the side abutting the lever handle 14 to abut said drum. The side of the shoe opposite the liner is in this instance, furnished with a socket 15 substantially midway its length for the reception of a spherically curved "ball" 16 or projection with rounded end extended from the lever 8, 9 within the named recess thereof. If desired, an arm B may be secured to the shoe to depend over the back of the drum 2 for assisting in maintaining the named parts in assembled relation.

In Figure 1 the drum 2 may be understood as adapted to rotate clockwise, and it is observed that the position of the gripping engagement of the nose 10 with the flange 2', in this instance, is midway the width of the end 9 of the lever arm and in line with the axes or rotation of the drum 2 and plate 3. It is observed further, that the ball 16 and the socket 15 lie at the right of that line or away therefrom in the direction of drum rotation. Due to the relation of the parts, therefore, it will be clear that in a movement of the lever-arm 8 toward the right the ball 16 will move in an arc described from the point of gripping engagement of the nose 10 at the flange 2' with the result that the shoe 12 will be instantly and firmly clamped upon the drum-flange 2', the leading end of said shoe, or that farthest to the right as viewed in the drawing, having greatest pressure and gripping action due to lying in the arc of movement described by said ball, said arc, if extended, passing through the flange 2'. The distance of travel of the lever-arm as occasioned by the cam 6 will, of course, advance the drum to the extent of the diameter of the cam's orbit. Upon the release of pressure of the cam in its orbital movement the shoe and lever-arm will be retracted due to the connection with said shoe of a retracting spring 17 attached to a convenient fixed part 18 of the mechanism frame, for example, the grip of the shoe and arm being terminated the instant the cam has released its pressure. As is customary, a lever-arm C clutching the drum prevents reverse action of that member after an advancing movement has been imparted to it, and such arm may be a duplicate of that described for positive results.

Naturally, the manner of associating the shoe and lever-arm, as by the ball and socket arrangement, or the equivalent thereof is a very important advantage in a clutch in that in any chance tilt of the clutching face of the flange 2' of the drum due to errors in manufacture, or from any other cause, or should the lever-arm have an erratic movement for any reason during action so as to effect the lever-arm the shoe since associated in free manner with the said lever-arm must always seat squarely and evenly so that its entire gripping surface will be brought into use for positive results.

The clutch described while serving to fully answer in producing positive action is wholly noiseless in action by reason of its structure, the nonmetallic liner 14 aiding in both results. Chiefly, so far as silent operation is concerned, is the fact that there are no metallic contacts other than the ball and socket surfaces, which, since naturally snugly fitting can at no time produce sound.

It is to be understood that while the form of the parts shown and described fully answer the requirements they may be changed in any slight manner without departing from the spirit and intent of the invention and still lie within the meaning of the appended claims.

We claim:

1. In a clutch, in combination with a member to be driven, a swingable lever-arm having spaced extensions fixed relatively adapted to lie astride and to receive between them part of said member, one of such extensions having a first gripping surface adapted to have gripping engagement with one surface of the member, and a shoe abutting the other extension and having a second gripping surface to engage an opposite surface of said member, the first named extension and the shoe adapted in a swing of the lever-arm in one direction to grip the member in driving relation, the said shoe and the second named extension being tiltable with respect to each other in all directions.

2. In a clutch, in combination with a member to be driven, a swingable lever-arm having spaced extensions fixed relatively adapted to receive between them part of said member, one of such extensions having a first gripping surface adapted to have gripping engagement with one surface of the member, and a shoe abutting the other extension and having a second gripping surface to engage an opposite surface of said member, the first named extension and the shoe adapted in a swing of the lever-arm in one direction to grip the member in driving relation, the shoe and the adjacent extension of the lever-arm engaging each other through a ball extension on one of them, there being a socket in the other of them to receive said ball extension whereby the shoe and its adjacent extension are tiltable with respect to each other in all directions.

3. In a swingable clutch, a clutch arm including two spaced apart faces adapted to receive between them a member to be rotated, one of said extensions having a first gripping surface adapted to grip one surface of said member, a shoe having a second gripping surface adapted for gripping the opposite surface of the latter, said shoe lying between that surface and the other of the two extensions, and a swivel connection between the shoe and the last named extension, the same being spaced at one side of a line passing through both the axis of rotation of the said member and the place of the engagement of such member and the first named extension, such spacing of the swivel connection from said line being in the direction of advance movement of said member.

4. A clutch including a swingable bifurcated arm, one of the opposed faces of the bifurcations thereof being adapted to engage a surface of a member to be driven, and a shoe lying adjacent the opposing face of the other extension adapted to engage the opposite surface of said member, and means lying between the shoe and said adjacent face of the extension to permit a universal swiveling action of said shoe with respect to said adjacent face.

THOMAS W. PALLISTER.
HENRY W. LEMAN.